May 4, 1965  J. E. LANNAN, JR  3,181,557
LIQUID INTERFACE SENSOR
Filed Nov. 2, 1962  2 Sheets-Sheet 1
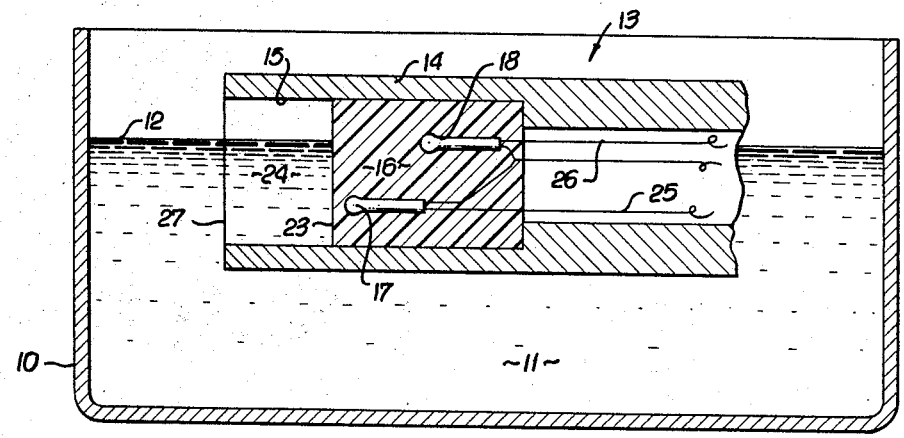
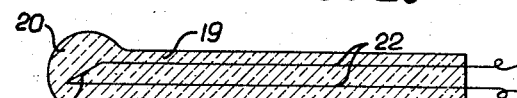
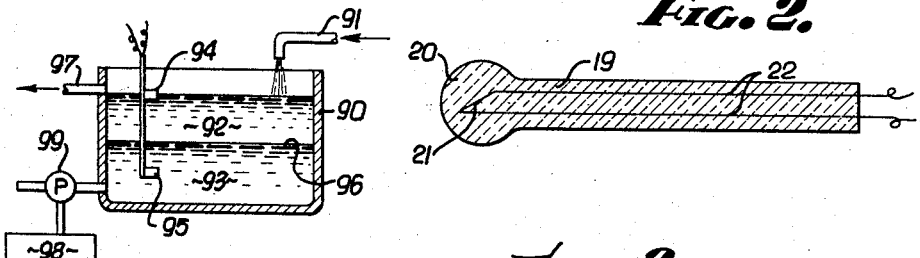
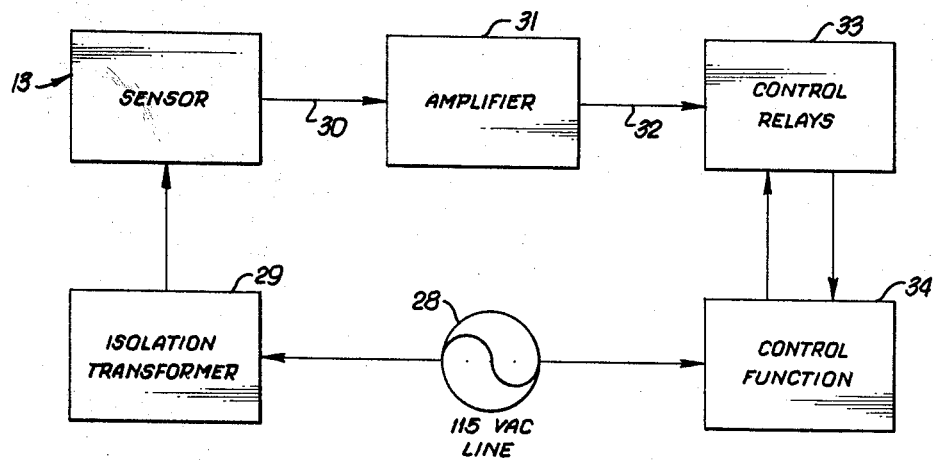
INVENTOR.
JAMES E. LANNAN, JR.
BY White & Haefliger
ATTORNEYS.

May 4, 1965   J. E. LANNAN, JR   3,181,557
LIQUID INTERFACE SENSOR
Filed Nov. 2, 1962
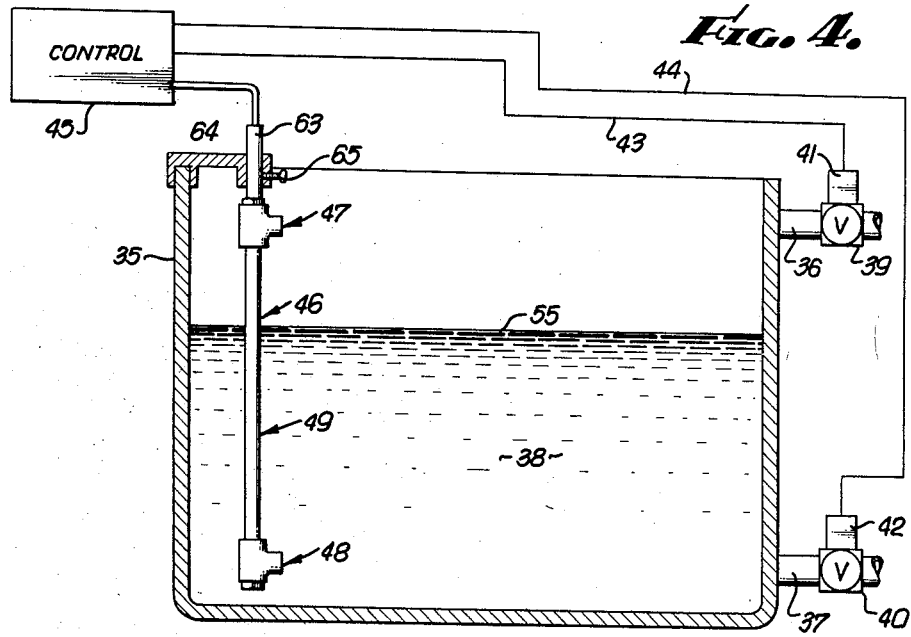
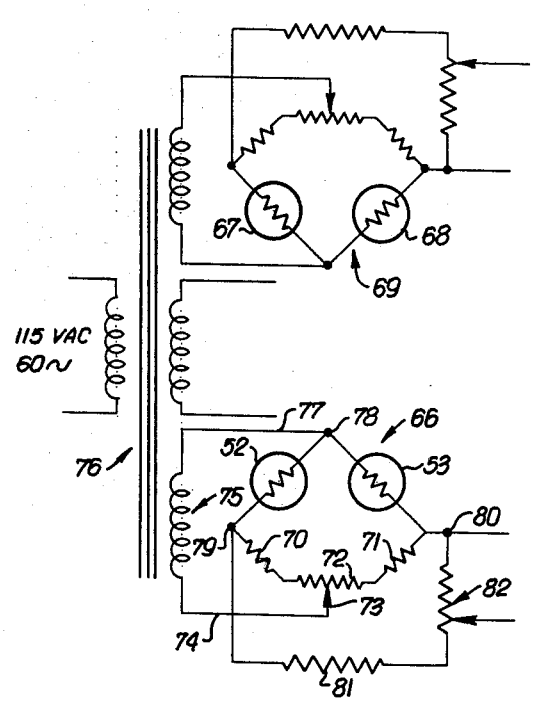
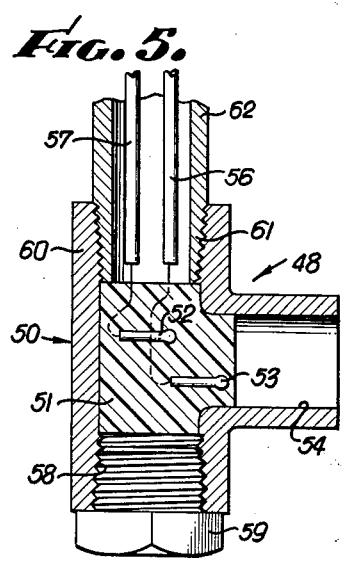
INVENTOR.
JAMES E. LANNAN, JR.
BY
*White & Haefliger*
ATTORNEYS.

United States Patent Office 3,181,557
Patented May 4, 1965

3,181,557
LIQUID INTERFACE SENSOR
James E. Lannan, Jr., 646 Meigs Road,
Santa Barbara, Calif.
Filed Nov. 2, 1962, Ser. No. 234,933
12 Claims. (Cl. 137—391)

This invention relates generally to fluid interface detection, and more particularly concerns improvements in apparatus operable to sense fluid or liquid level changes and to control fluid or liquid levels.

It is a major object of the invention to provide a preferably solid state device utilizing electrically energizable elements having impedance that vary with temperature and which are protectively embedded in thermally semi-conductive material and in differential heat transfer proximity to a fluid level zone, in a body recess. The latter is so formed that flowable substance may easily become entrapped therein, to an extent that it may be considered as essentially non-flowing. As a consequence, heat transfer from one element will be affected to relatively greater degree by a change in heat absorption capacity of substance in the recess and heat transfer from the other element will be affected to relatively lesser degree by such a change. The elements may then be used to detect such a change, which occurs when the fluid or liquid phase level changes in the body recess. Advantages of the detector include ability to compensate for changes in temperature of the fluid medium, lack of significant response to flow of the fluid medium, as distinguished from changes in the level thereof, no moving parts exposed to the fluid, and solid state construction to preclude the possibility of arcing.

It is another object of the invention to provide a novel high and low liquid level sensing apparatus characterized as readily adjustable to establish desired high and low liquid level limits and insertible in a liquid pool to sense arrival of the liquid surface at the level limits. Such apparatus may be used to control valves or pumps which are operable to effect filling and emptying of the receptacle to degrees determined by the level limits thereby established by the sensing apparatus, as will be described.

These and other objects and advantages of the invention, as well as the details of an illustrative embodiment, will be more fully understood from the following detailed description of the drawings, in which:

FIG. 1 is a vertical section through the fluid interface detector shown in a pool of liquid;

FIG. 2 shows a thermistor type element the impedance of which varies with temperature;

FIG. 3 is a block diagram showing use of the sensor as a control;

FIGS. 4 and 4a are vertical sections through high and low liquid level sensing apparatus incorporating the novel solid state sensors;

FIG. 5 is a vertical section showing the construction of one of the high and low level sensors as may be used in FIG. 4; and FIG. 6 is a circuit diagram showing the manner in which the high and low level sensors of FIG. 4 may be connected in bridge circuits.

Referring first to FIG. 1, a receptacle is shown at 10 as containing a pool of liquid 11 the top level of which is indicated at 12. The receptacle also contains the novel device for detecting the presence or absence of the fluid level 12 at the general level of the device 13, and broadly considered it may be said to comprise a fluid interface sensor since the surface 12 is an air-liquid interface.

Referring more particularly to the device 13, it operates on the principle of detecting heat absorption rate differences of flowable substance, such as the liquid 11, or the air above the liquid, or any other flowable substance whether solid or fluid. The device includes a body comprising a body shell 14 which is recessed at 15. Contained within the shell inwardly of the recess is a solid mass of thermally semi-conductive body material 16 which may typically but not necessarily comprise epoxy resin. Embedded in the latter are first and second electrically energizable means or elements 17 and 18, each characterized as having impedance that varies with temperature, and these elements may typically but not necessarily comprise thermistors as are better shown in FIG. 2. Briefly, they comprise glass envelopes 19 having terminals 20 in which are embedded electrically energizable parts 21 characterized as having resistance which decreases in response to temperature increase whereby the signal transmitted through the leads 22 will vary with temperature change.

It will be noted from FIG. 1 that the elements 17 and 18 are located in differential heat transfer proximity to the recess 15. More particularly, the first element 17 is located much closer to the recess, the bottom face of which is shown at 23, so that heat transfer from the element 17 will be affected to relatively greater degree by a change in heat absorption capacity of substance in the recess 15, such substance being indicated at 24. On the other hand, the element 18 is located much further from the bottom 23 of the recess so that heat transfer from that element will be affected to relatively lesser degree by a change in heat absorption capacity of such substance. In this connection it will be understood that a change in substance heat absorption capacity in the recess will in most instances occur upon a change in the fluid medium in the recess, as for example occurs when the level 12 rises to enter the recess, or drops to leave the recess. Accordingly, upon electrical energization of the elements 17 and 18, the signals transmitted through the leads 25 and 26 will change with respect to one another when the interface or level 12 enters or leaves the recess, making possible sensing of such an interface level change. It should also be pointed out that temperature difference of fluids entering or leaving the recess are compensated for by the device, since both of the elements 17 and 18 will be equally affected by ambient temperature changes of the fluid.

Referring to the recess 15 it is sized in such manner as to receive the substance therein in relatively non-flowing condition, whereby the elements 17 and 18 will be substantially unaffected, in so far as heat transfer is concerned, by flowage of the fluid outside or exterior to the recess 15. If desired, a flow damping means such as a perforated cap may be placed over the open end 27 of the body shell to further isolate exterior flow from quiescent conditions in the recess.

FIG. 3 shows in block form a typical connection of the sensor 13 with other components in order that the sensor may control operating equipment. The sensor block 13 is shown as electrically energized as by means of a 115 volt A.C. source 28 through an isolation transformer 29. The output 30 of the sensor is amplified at 31 and fed at 32 to a control relay component 33 which in turn controls equipment designated by the block 34. The latter may also be powered from the source 28.

Referring now to FIG. 4, a receptacle is shown at 35 as having an upper inlet 36 and a lower outlet 37 and liquid 38 in the receptacle or tank. Connected into the inlet and outlet lines are control valves 39 and 40 which are operated by actuators 41 and 42. The latter are in turn connected by lines 43 and 44 with a master controller 45.

Inserted into the tank 35 is shown a level detecting device 46 which typically includes a high level sensor generally indicated at 47, and a low level sensor 48, there being means 49 interconnecting the sensors 47 and 48.

Extending the description to FIG. 5 the low level sensor 48 typically comprises a pipe T 50 containing a mass of thermally semiconductive body material 51 in which is embedded a pair of thermistors 52 and 53 which are again carried in differential heat transfer proximity to the T recess 54. The thermistors function as previously described in connection with FIG. 1, whereby when the liquid surface level 55 enters or leaves the laterally opening recess 54 there will be a change as respects the relative signals transmitted by the thermistors through the leads 56 and 57.

The bottom threaded opening 58 of the T is closed as for example by the plug 59, whereas, the upper interiorly threaded arm 60 of the T receives the lower threaded end 61 of a pipe 62 through which the leads 57 and 56 extend. Pipe 62 is of a length sufficient to vertically offset the sensors 47 and 48 to desired extent, and it is clear that such vertical offsetting may be rapidly altered by connecting a different length pipe 62 between the sensors. In this regard the upper sensor 47 is of the same construction as the lower sensor. A support pipe 63 is connected into the upper end of the upper sensor to suspend the apparataus typically as shown in FIG. 4. Thus, the support pipe 63 may have a slip fit with a hanger 64 and may be adjustably connected thereto as by the fastener 65 to allow vertical adjustment of the apparatus 46.

Extending the description to FIG. 6, thermistors 52 and 53 of the lower sensor are shown as connected in a bridge circuit 66, and the thermistors 67 and 68 of the upper sensor 47 are shown connected in a bridge circuit 69. Wheatstone circuit 66 also includes the first resistors 70 and 71 which are interconnected through the potentiometer resistance 72. The wiper 73 from the potentiometer is connected by lead 74 to a secondary portion 75 of the power supply 76, and a lead 77 returns from the secondary to the junction 78 between the two thermistors 52 and 53. The output of the bridge circuit appears across the junctions 79 and 80, and it may be passed through fixed and variable resistances 81 and 82, the voltage across the latter being subject to amplification within the control 45. The upper bridge 69 is of the same construction as the lower bridge circuit and therefore will not be described.

The bridges may be balanced, as by adjustment of the potentiometer wiper 73 in the case of the lower bridge 66, in such manner as to produce a change in output when the liquid level 65 enters or leaves the recesses association with the sensors, as for example the recess 54 of the sensor 48. Furthermore, a change in output may be utilized to control the valves 39 and 40. Thus, when the liquid level 55 reaches the sensor 47 the valve 40 may be opened to drain liquid from the tank. Thereafter, when the level 55 drops and leaves the sensor 48 the valve 40 may be closed and valve 39 opened to fill liquid back into the tank. Such filling continues until the level 55 reaches the sensor 47, at which time the valve 39 closes and the valve 40 opens. As a result, the liquid may be cycled into and out of the tank as desired. It is clear that many other control functions may be performed by the apparatus 46 as respects the control of liquid level in the tank.

In FIG. 4a the settling tank 90 receives its input through line 91 and the received fluid separates into a multiphase system such as indicated by lighter phase 92 and heavier phase 93. By balancing the upper sensor 94 in the lighter fluid 92 and the lower sensor 95 in the heavier fluid 93, effective control is obtained. Thus, as the heavier fluid level 96 rises, the separated lighter phase drains through outlet 97. When the interface level reaches the upper sensor 94, the latter's bridge circuit becomes unbalanced and this causes the control 98 to operate pump 93. The latter removes heavier liquid 93 until the level 96 drops to the lower sensor 95, after which the cycle repeats.

I claim:

1. In a sensor device for detecting heat absorption rate differences of flowable substance, a body having a recess wherein said substance is receivable in relatively non-flowing condition for heat transfer, first and second electrically energizable means each characterized as having impedance that varies with temperature, said means being carried in thermally semi-conductive body material and in differential heat transfer proximity to said recess so that heat transfer from the first means will be affected to relatively greater degree by a change in heat absorption capacity of substance in said recess, and heat transfer from the second means will be affected to relatively lesser degree by said change, said material having a face exposed to said recess interiorly thereof and to remain contacted by said flowable substance during a change in the surface level thereof in said recess, said first and second means being located interiorly of said material with the spacing of said second means from said face being substantially greater than the spacing of said first means from said face.

2. In a sensor device for detecting heat absorption rate differences of flowable material, a body having a recess wherein said substance is receivable in relatively non-flowing condition for heat absorption, first and second electrically energizable thermistors each characterized as having impedance that varies with temperature, said thermistors being embedded in thermally semi-conductive body material and in differential heat transfer proximity to said recess so that heat transfer from the first thermistor will be affected to relatively greater degree by a change in heat absorption capacity of substance in said recess, and heat transfer from the second thermistor will be affected to relatively lesser degree by said change, said material having a face exposed to said recess interiorly thereof and to remain contacted by said flowable substance during a change in the surface level thereof in said recess, said first and second thermistors being located interiorly of said material with the spacing of said second thermistor from said face being substantially greater than the spacing of said first thermistor from said face.

3. The invention as defined in claim 2 in which said body material in which said thermistors are embedded comprises resin.

4. The invention as defined in claim 3 in which said body comprises a metallic shell having an opening, said resin being received in said shell in inwardly offset relation to said opening.

5. The invention as defined in claim 2 including a Wheatstone bridge circuit of which said thermistors comprise legs.

6. In a fluid level sensing apparatus, a high level sensor as defined in claim 1, a low level sensor as defined in claim 1, and means interconnecting said sensors for vertically offset exposure to a fluid interface movable vertically, each sensor including electrically energizable circuit elements located in differential heat transfer proximity to a sensor zone adapted to receive said fluid interface.

7. The invention as defined in claim 6 including a receptacle for receiving the fluid and the sensors being located for exposure thereto at predetermined high and low levels, first means for controlling receptacle fluid flow, and other means for controlling said first means in response to sensor detection of the fluid interface.

8. The invention as defined in claim 7 in which said valve means comprises a receptacle inlet valve adapted to be opened when the low level sensor detects said interface and closed when the high level sensor detects said interface, and a receptacle outlet valve adapted to be opened when the high level sensor detects said interface and closed when the low level sensor detects said interface.

9. The invention as defined in claim 7 in which the electrically energizable means of each sensor comprise thermistors connected in a bridge circuit adapted to become unbalanced upon detection of said fluid interface, said means for controlling said valve means including amplifier circuitry for amplifying the unbalanced bridge circuit output and relay means responsive to the amplifier output.

10. The invention as defined in claim 6 in which said means interconnecting said sensors includes threaded upper and lower housings containing said high and low level sensors respectively, and elongated threaded end pipe means detachably connected to said housings, the length of said pipe means being predetermined to correspond to the desired high and low level sensing operation of said sensors.

11. The invention as defined in claim 10 including a receptacle for containing liquid in which said housings and interconnecting pipe means are suspended to extend with said housings vertically offset.

12. The invention as defined in claim 7 in which said first means includes a low level outlet for heavier fluid in the receptacle and a high level outlet for lighter fluid in the receptacle, said first and other means being operable to effect removal of said heavier fluid through said low level outlet after the interface between said lighter and heavier fluids is sensed by said high level sensor and until said interface is sensed by said low level sensor.

References Cited by the Examiner
UNITED STATES PATENTS

| | | | |
|---|---|---|---|
| 2,468,791 | 5/49 | Thomson | 137—392 XR |
| 2,573,172 | 10/51 | Ennis et al. | 137—392 XR |
| 2,642,675 | 6/53 | Hertenstein | 137—392 XR |
| 2,660,883 | 12/53 | Wyczalek | 73—359 |
| 2,667,178 | 1/54 | Fred et al. | 138—392 |
| 2,852,937 | 9/58 | Maze | 73—304 |
| 2,861,159 | 11/58 | Seney | 137—392 XR |
| 2,884,131 | 4/59 | Mocarski | 137—392 XR |
| 2,904,995 | 9/59 | Obermaier | 73—359 |
| 2,928,037 | 3/60 | Lawrence | 137—392 XR |

FOREIGN PATENTS 772,046   4/57   Great Britain.

WILLIAM F. O'DEA, *Primary Examiner.*

LAVERNE D. GEIGER, *Examiner.*